(12) United States Patent
Schmidt et al.

(10) Patent No.: US 9,049,357 B2
(45) Date of Patent: Jun. 2, 2015

(54) COLLAPSIBLE VIEWING DEVICE FOR CAMERA LCD SCREEN

(71) Applicants: Robert P. Schmidt, West Hollywood, CA (US); Louis J. Schmidt, Hermosa Beach, CA (US); Michael R. Schmidt, Hermosa Beach, CA (US)

(72) Inventors: Robert P. Schmidt, West Hollywood, CA (US); Louis J. Schmidt, Hermosa Beach, CA (US); Michael R. Schmidt, Hermosa Beach, CA (US)

(73) Assignee: Hoodman Corporation, Torrance, CA (US)

( * ) Notice: Subject to any disclaimer, the term of this patent is extended or adjusted under 35 U.S.C. 154(b) by 132 days.

(21) Appl. No.: 13/762,560

(22) Filed: Feb. 8, 2013

(65) Prior Publication Data

US 2014/0226055 A1 Aug. 14, 2014

(51) Int. Cl.
 *H04N 5/225* (2006.01)
 *G03B 17/56* (2006.01)
 *G03B 11/04* (2006.01)
 *G02B 23/20* (2006.01)

(52) U.S. Cl.
 CPC ............ *H04N 5/2251* (2013.01); *G03B 17/566* (2013.01); *G03B 11/04* (2013.01); *G02B 23/20* (2013.01)

(58) Field of Classification Search
 None
 See application file for complete search history.

(56) References Cited

U.S. PATENT DOCUMENTS

| | | | |
|---|---|---|---|
| 2001/0019662 A1* | 9/2001 | Shono | 396/287 |
| 2002/0126216 A1* | 9/2002 | Schmidt | 348/333.01 |
| 2006/0216024 A1* | 9/2006 | Jutamulia | 396/544 |
| 2008/0030868 A1* | 2/2008 | Schmidt et al. | 359/643 |
| 2013/0222668 A1* | 8/2013 | Anderson | 348/333.08 |

\* cited by examiner

*Primary Examiner* — Justin P Misleh
(74) *Attorney, Agent, or Firm* — Fildes & Outland, P.C.

(57) ABSTRACT

A collapsible viewing device for a camera LCD screen includes a base having an open camera end that is sized to fit around an associated camera display screen. An eyepiece opposite the base allows for viewing an image on the associated camera display screen. A flexible, light-blocking sidewall extends between the base and the eyepiece. The viewing device is configurable between an expanded use disposition in which the eyepiece is spaced from the base and a collapsed, compact disposition in which the sidewall is non-hingedly collapsed into the base.

11 Claims, 2 Drawing Sheets

COLLAPSIBLE VIEWING DEVICE FOR CAMERA LCD SCREEN

TECHNICAL FIELD

This invention relates to devices such as digital cameras, and more particularly to devices for viewing camera LCD view screens while also shielding the view screens to prevent glare.

BACKGROUND OF THE INVENTION

It is known in the art relating to digital cameras that an LCD screen or similar display on the digital camera is used to review captured images to check the focus, lighting, composition, expression, and other similar attributes prior to taking the next shot. The LCD screen is also used in lieu of the camera's viewfinder to view images for capture. Digital cameras are often used in outdoor settings, and glare caused by sunlight on an LCD screen severely hinders the viewing of images displayed on a digital camera LCD screen. Often, a photographer has to use one hand to awkwardly shield the camera LCD screen in order to be able to view the screen. This is cumbersome and only marginally effective, thereby detracting from the quality of the photographer's pictures and slowing the picture taking process.

SUMMARY OF THE INVENTION

The present invention provides an illuminatable screen hood, adapted for use with digital cameras with LCD screens, smartphones, or the like, that eliminates screen glare for improved outdoor LCD screen viewing capability. The LCD screen hood is placeable about a digital camera LCD screen or similar display screen to cover the LCD screen and to block the LCD screen from ambient light. Further, the LCD screen hood may be used by military personnel for viewing a smartphone screen at night to avoid illumination of the user and his or her surroundings by the light from the smartphone screen. The LCD screen hood also includes a lens arrangement that allows a photographer to magnify viewed images on the LCD screen, and an eye cup that allows the photographer to place his/her eye up against the hood to completely seal out light from the inside of the hood. The present invention also provides a screen hood that is non-hingedly collapsible from an extended disposition to a collapsed, retracted disposition.

More particularly, a collapsible viewing device for a camera LCD screen in accordance with the invention includes a base having an open camera end that is sized to fit around an associated camera display screen. An eyepiece opposite the base allows for viewing an image on the associated camera display screen. A flexible, light-blocking compactable sidewall extends between the base and the eyepiece. The viewing device is configurable between an expanded use disposition in which the eyepiece is spaced from the base and a collapsed, compact disposition in which the sidewall is collapsed into the base.

The sidewall may be formed of one of a silicone material and a thermoplastic elastomer. The base may have a cross-sectional shape that is generally a parallelogram. For example, the base has a rectangular cross-sectional shape. The sidewall may decrease in cross-section from the base towards the eyepiece. The base may be wider in cross-section than the eyepiece. An eye cup may be mounted on the eyepiece for shielding the eyepiece lens from ambient light. The viewing device may include a mount for mounting the viewing device to a support. The viewing device in use may be hand-held about a display screen of an associated camera. A lanyard may be connected to an outer surface of the sidewall proximate the eyepiece. The eyepiece may be adjustable to provide a plus or minus 3 diopter adjustment.

These and other features and advantages of the invention will be more fully understood from the following detailed description of the invention taken together with the accompanying drawings.

DETAILED DESCRIPTION OF THE INVENTION

Figure 1:
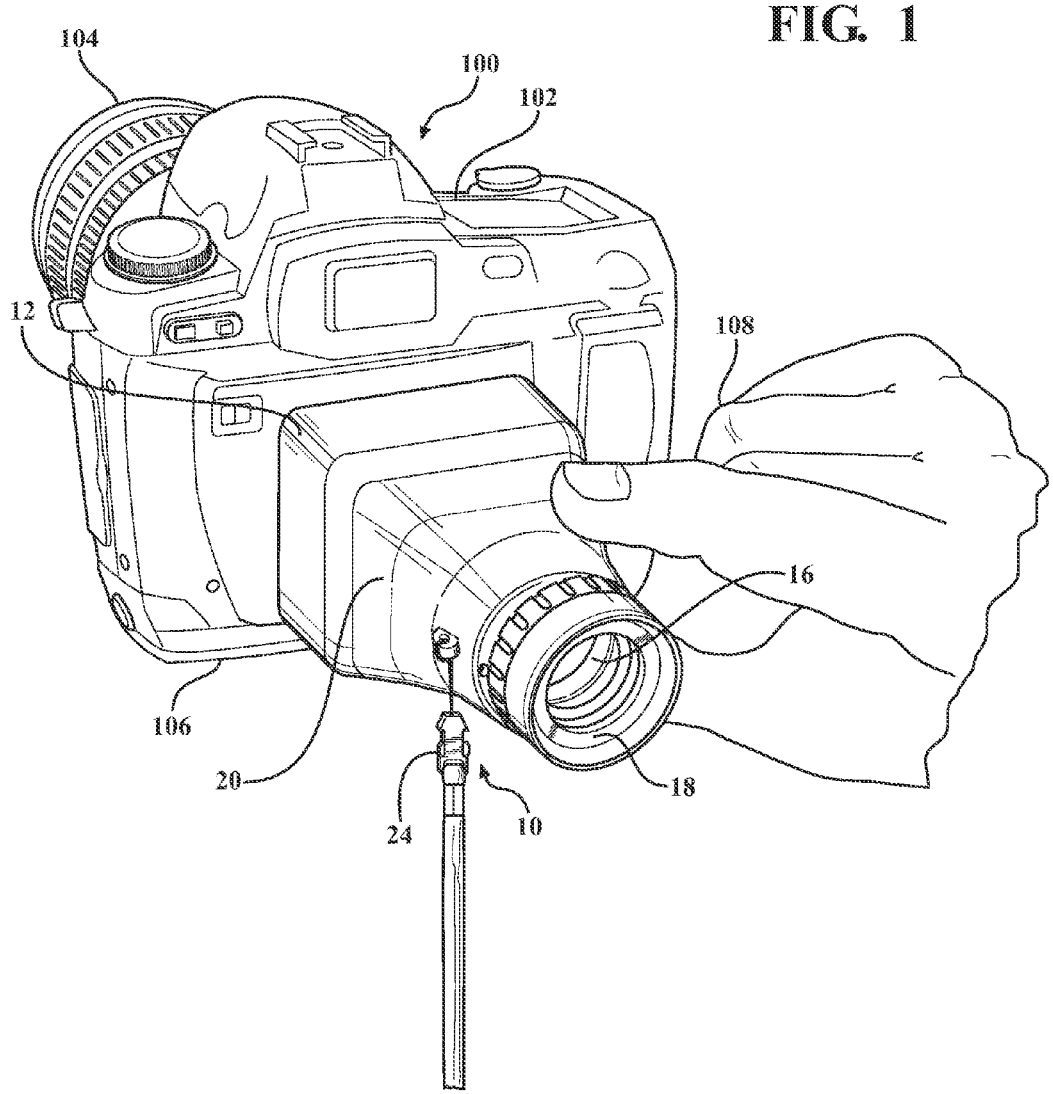
FIG. 1 is an environmental view of a digital camera with a collapsible viewing device in accordance with the invention being held by a user with a generally rectangular end against the camera back and covering the camera LCD screen.

Referring now to the drawings in detail, numeral 10 generally indicates a collapsible viewing device for a camera LCD screen. The viewing device 10 is placeable about a digital camera LCD screen or other similar display screen such as a smartphone screen to cover the LCD screen and to block the LCD screen from ambient light. The viewing device 10 is collapsible from an extended disposition to a collapsed, retracted disposition.

Referring first to FIG. 1 of the drawings there is shown a pictorial view of an exemplary digital camera 100 of known construction having a body 102, a lens 104 mounted on the front, and a back 106 mounting a display screen such as an LCD view screen, not shown, but of known construction. Behind the camera, is shown a hand 108 of a user holding a collapsible viewing device 10 in the form of an LCD screen hood against the back 106 of the camera. The viewing device 10 is positioned so that it rests against the back 106 of the camera and covers the LCD screen, preventing the entry of ambient light into the viewing device 10 so that a user may view the screen and the images thereon clearly and free from external light. The viewing device 10 is an example of a light blocking hood in accordance with the present invention shown in use with a camera 100 for which the hood may be specifically designed.

Figure 2:
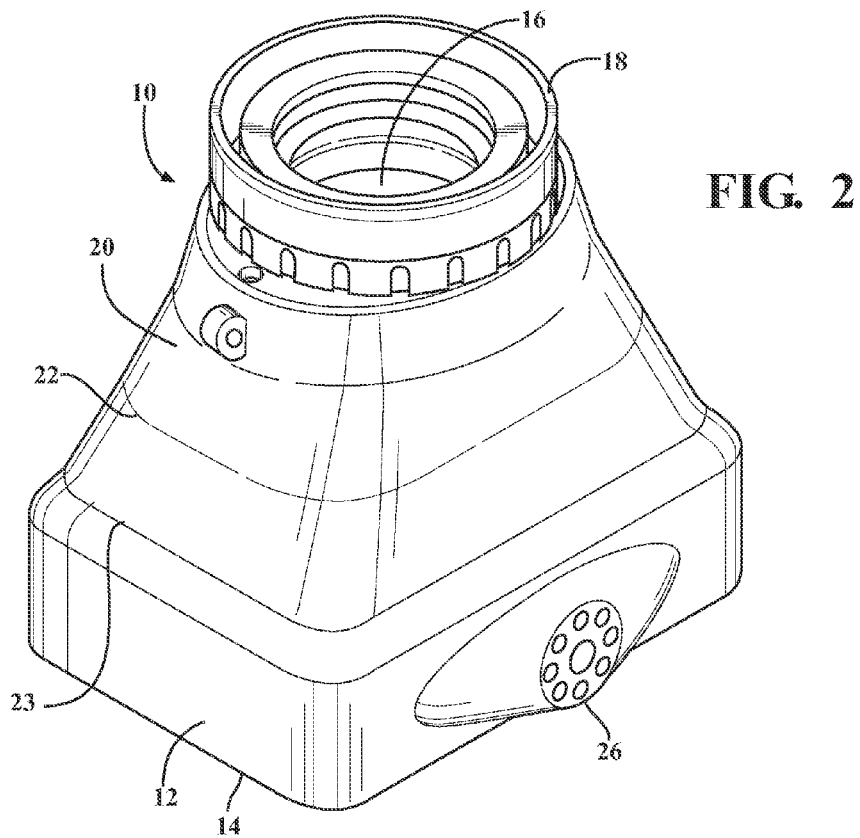
FIG. 2 is a perspective view of a collapsible viewing device for a camera LCD screen in accordance with the invention in an extended, uncollapsed disposition.
Figure 3:
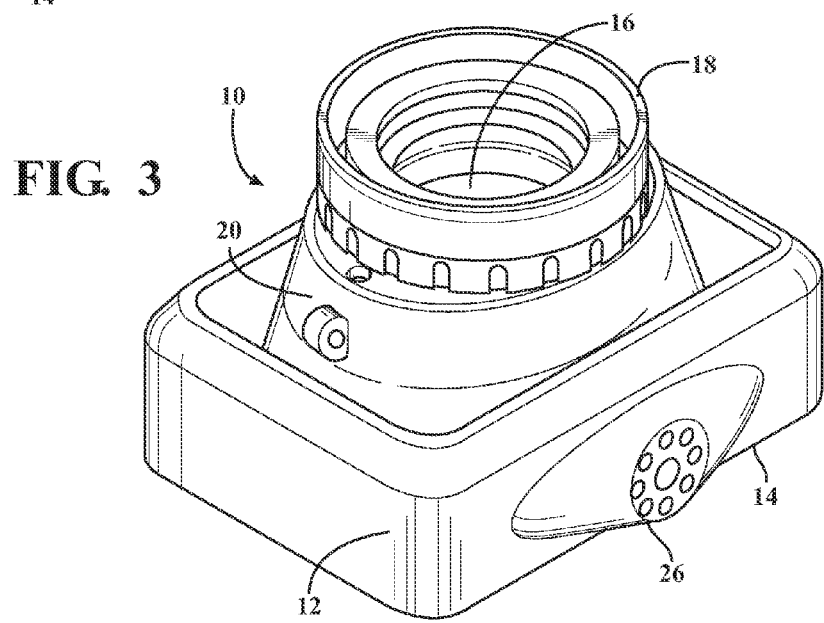
FIG. 3 is a perspective view of the viewing device in a collapsed disposition.

As shown in FIGS. 2 and 3, in one embodiment the collapsible viewing device 10 includes a base 12 having an open camera end 14 that is sized to fit around an associated camera display screen such as a camera LCD screen or similar. The open camera end 14 may be generally rectangular, or alternatively may be square, but in any event has a shape that generally matches that of the associated camera display screen. In use, the open camera end 14 contacts the back 106 of the camera 100, enclosing the LCD screen. An eyepiece 16 disposed opposite the base 12 allows for viewing an image on the associated camera display screen. The eyepiece 16 may include an eye cup 18 that shields the eyepiece from ambient light. A single-piece, flexible, light-blocking sidewall 20 extends between the base 12 and the eyepiece 16. In an extended disposition, the sidewall 20 tapers inwardly from the base 12 to the eyepiece 16 such that the base is wider in cross-section than the eyepiece. The viewing device 10 is configurable between the expanded disposition (FIG. 2) in which the eyepiece 16 is spaced from the base 12 and a collapsed disposition (FIG. 3) in which the sidewall 20 is collapsed into the base. Collapsing of the sidewall 20 allows for easier carrying and storage during times of non-use, while the expanded disposition is utilized for viewing images with the viewing device 10. However, the internal optics of the viewing device 10 also allow a user to view images in the collapsed, compact disposition.

The flexible sidewall 20 may be formed of a hypoallergenic silicone material, thermoplastic elastomers, or other similarly flexible material. The flexibility and tapered shape of the sidewall 20 allows it to fold under force such as that applied by a user's fingers. For example, the sidewall 20 may generally fold in half, and may become partially inverted into the base 12. The sidewall 20 may include one or more living hinges 22, 23 such as a crease or similar fold line that facilitates collapse of the sidewall. In one embodiment, one of the living hinges 22 may be generally centrally disposed around the sidewall intermediate the base 12 and the eyepiece 16, while the other living hinge 23 is generally disposed adjacent or proximate the base 12 and spaced from the first living hinge 22. The sidewall 20 does not include any mechanical hinge. The base 12 may be formed of a rigid or semi-rigid plastic or metal material which may also be covered with the same material that forms the flexible sidewall 20. Alternatively, the base 12 may be integrally formed with the sidewall 20, and the base 12 may be thicker than the sidewall 20.

A lanyard 24 may also be connected to an outer surface of the flexible sidewall 20 proximate the eyepiece 16 to allow a user to conveniently carry the viewing device 10. Also, a mount 26 such as a threaded receiver for a ¼"-20 mounting screw of a ¼"-20 mounting system, may be disposed on the base 12 and/or sidewall 20 to allow the viewing device 10 to be supported by a support structure during use.

The eyepiece 16 includes a lens housing. The eye cup 18 is attached to the lens housing. The eye cup 18 may be sized such that it is large enough to surround a human eye that is placed up to the eyepiece. An optical eyepiece lens is disposed inside of the lens housing. Also, one or more optical lens, for example a single objective lens or a group of cooperative objective lenses, may be disposed within the sidewall 20 of the viewing device 10. The lenses cooperate to magnify the image on the camera LCD screen. The optical magnification provided by the lenses may range from between 1× and 2.5× magnification. In one embodiment of the invention, 1.5× magnification may be the optimal magnification, although this value may vary depending on the size of the LCD screen.

The eyepiece 16 may also provide a diopter adjustment that allows for focusing of an image viewed through the eyepiece and that accommodates for vision imperfections of specific users of the viewing device 10. The diopter adjustment may be performed by rotating the lens housing relative to the sidewall of the viewing device, to move the eyepiece lens toward and away from the sidewall and hence closer to or farther from the objective lens(es). For example, the lens housing may have a threaded surface that can be screwed inwardly and outwardly relative to the sidewall. In one embodiment of the invention, the eyepiece may provide a plus or minus three (+/−3) diopter adjustment.

The viewing device 10 may be placeable about a digital camera's LCD screen. For example, a user may grip the sidewall of the viewing device 10 and hold the camera end 14 of the viewing device up against the periphery of the camera LCD screen. Once the viewing device 10 is placed about the LCD screen, a user may place his or her eye up to the eyepiece 16 to view the shielded LCD screen. Alternatively, the viewing device 10 may be modified for attachment about the LCD screen with any suitable mounting means, for example, by mounting on a protective cap projecting outward around the screen. In yet another alternative, the viewing device 10 may be mounted on a ¼"-20 threaded screw of a mounting system support, such as for supporting the viewing device when used in conjunction with a camera for video capture.

The length from the camera end 14 of the viewing device 10 to the eyepiece 16, and hence the distance of a user's eye from the eyepiece to the LCD screen, is for practical reasons preferably less than seven inches. Viewing devices that are larger than seven inches in length are less convenient to use. Because the human eye has difficulty focusing on objects that are less than seven inches from the eye, the lens or multiple lenses of the eyepiece magnify and focus the image of the LCD screen on the user's eye at distances of five inches or less. This in turn allows the viewing device 10 to be designed to have a length from the camera end 14 to the eyepiece 16 of approximately five inches or less.

The lens arrangement of the eyepiece 16 also prevents over-magnification of the LCD screen. If the LCD screen were to be over-magnified, the user would undesirably see only dots (the pixels of the screen) instead of a coherent image. It can therefore be seen that the optimal magnification factor provided by the viewing device depends upon the size of the LCD screen (i.e., the size/number of pixels).

The optical lenses of the eyepiece 16 may be made of glass, plastic, or any other suitable materials for making lenses.

While the invention is particularly adapted for the afore described uses, it should be understood that as designed, or with changes apparent to those skilled in the art, the invention may be adapted for uses other than in the digital camera field which may fall within the scope of the appended claims, such as use for viewing a smartphone screen. The invention may also be used to view images on a screen other than an LCD-type display.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A collapsible viewing device for a camera LCD screen, the viewing device comprising:
   a base having an open camera end that is sized to fit around an associated camera display screen;
   an eyepiece opposite the base for viewing an image on the associated camera display screen; and
   a flexible, light-blocking compactable sidewall extending between the base and the eyepiece, said sidewall including one or more living hinges along which the sidewall is collapsible;
   wherein the viewing device is configurable between an expanded disposition in which the eyepiece is spaced from the base and a collapsed disposition in which the sidewall is partially inverted and collapsed into the base such that in the collapsed disposition the sidewall fits within the base in a nesting relationship.

2. The collapsible viewing device of claim 1, wherein the sidewall is formed of one of a silicone material and a thermoplastic elastomer.

3. The collapsible viewing device of claim 1, wherein the base has a cross-sectional shape that is generally a parallelogram.

4. The collapsible viewing device of claim 3, wherein the base has a rectangular cross-sectional shape.

5. The collapsible viewing device of claim 1, wherein the sidewall decreases in cross-section from the base towards the eyepiece.

6. The collapsible viewing device of claim 5, wherein the base is wider in cross-section than the eyepiece.

7. The collapsible viewing device of claim 1, including an eye cup mounted on the eyepiece for shielding an eyepiece lens from ambient light.

8. The collapsible viewing device of claim 1, including a mount for mounting the viewing device to a support.

9. The collapsible viewing device of claim 1, including a lanyard connected to an outer surface of the sidewall proximate the eyepiece.

10. The collapsible viewing device of claim 1, wherein the viewing device in use is hand-held about a display screen of an associated camera.

11. The collapsible viewing device of claim 1, wherein the eyepiece is adjustable to provide a plus or minus 3 diopter adjustment.

\* \* \* \* \*